(12) United States Patent
Hsu-Hoffman

(10) Patent No.: US 12,456,128 B2
(45) Date of Patent: Oct. 28, 2025

(54) INTERACTIVE REWARDS SYSTEM FOR REWARDING DRIVERS

(71) Applicant: Allstate Insurance Company, Northbrook, IL (US)

(72) Inventor: Chienlan Hsu-Hoffman, Palo Alto, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/492,740

(22) Filed: Oct. 4, 2021

(65) Prior Publication Data

US 2022/0277332 A1    Sep. 1, 2022

Related U.S. Application Data

(63) Continuation of application No. 16/436,361, filed on Jun. 10, 2019, now Pat. No. 11,138,622, which is a continuation of application No. 14/510,183, filed on Oct. 9, 2014, now Pat. No. 10,360,576.

(51) Int. Cl.
G06Q 30/02      (2023.01)
G06Q 30/0207    (2023.01)
G07C 5/00       (2006.01)

(52) U.S. Cl.
CPC ......... *G06Q 30/0207* (2013.01); *G07C 5/008* (2013.01)

(58) Field of Classification Search
CPC ............................... A63F 13/69; A63F 13/79
See application file for complete search history.

(56) References Cited

U.S. PATENT DOCUMENTS 6,830,514 B2   12/2004   Meyer et al.
7,722,454 B2    5/2010   Thompson et al.
8,140,358 B1    3/2012   Ling et al.
(Continued)

FOREIGN PATENT DOCUMENTS

EP         2312552 A3      7/2011
WO   WO-2009095658 A1 *    8/2009   ............... G01D 4/00
(Continued)

OTHER PUBLICATIONS

Foxx R.M., et al., "A Company-Based Lottery to Reduce the Personal Driving of Employees," Journal of Applied Behavior Analysis, Fall 1981, vol. 14 (3), Feb. 27, 2013, pp. 273-285.
(Continued)

*Primary Examiner* — Vincent M Cao

(57) ABSTRACT

Methods, computer-readable media, software, and apparatuses are disclosed for an interactive rewards system for engaging and rewarding drivers. In one aspect, a system comprising a first computing device associated with a driver and a second computing device is disclosed, where the second computing device is configured to receive, from the first computing device, driving score information for the driver, assign at least one lottery ticket to the driver based on the driving score information, and send, to the first computing device, a notification indicating that the at least one lottery ticket has been assigned to the driver. In another aspect, the second computing device may be configured to assign, to a driver, a card for a virtual card game. The particular card assigned may be based on the driver's driving behavior.

20 Claims, 5 Drawing Sheets

(56) References Cited

U.S. PATENT DOCUMENTS

| | | | |
|---|---|---|---|
| 8,688,481 | B2 | 4/2014 | Grosso et al. |
| 8,751,563 | B1* | 6/2014 | Warden .................. G06F 16/24 709/224 |
| 2002/0028708 | A1 | 3/2002 | Busch et al. |
| 2002/0111725 | A1 | 8/2002 | Burge |
| 2004/0162134 | A1 | 8/2004 | Walker et al. |
| 2005/0240438 | A1* | 10/2005 | Day ....................... G06Q 30/02 705/2 |
| 2005/0261049 | A1 | 11/2005 | Borruso |
| 2005/0288081 | A1 | 12/2005 | Amaitis et al. |
| 2007/0191084 | A1 | 8/2007 | Tarantino |
| 2008/0146334 | A1* | 6/2008 | Kil ......................... G06Q 40/08 463/36 |
| 2009/0186328 | A1 | 7/2009 | Robinson et al. |
| 2009/0280891 | A1 | 11/2009 | Filipour et al. |
| 2009/0287579 | A1 | 11/2009 | Walker et al. |
| 2011/0028160 | A1 | 2/2011 | Roeding et al. |
| 2011/0124390 | A1 | 5/2011 | Wilen |
| 2012/0072241 | A1 | 3/2012 | Krause et al. |
| 2012/0215328 | A1* | 8/2012 | Schmelzer ............. G16H 20/30 700/91 |
| 2012/0296727 | A1 | 11/2012 | Gore et al. |
| 2013/0007041 | A1 | 1/2013 | Comparelli et al. |
| 2013/0060583 | A1* | 3/2013 | Collins ................... G06Q 40/08 705/4 |
| 2013/0085819 | A1 | 4/2013 | Gore et al. |
| 2013/0090821 | A1 | 4/2013 | Abboud et al. |
| 2013/0138460 | A1 | 5/2013 | Schumann, Jr. et al. |
| 2013/0141249 | A1* | 6/2013 | Pearlman ................. H04Q 9/00 340/870.03 |
| 2013/0179198 | A1 | 7/2013 | Bowne et al. |
| 2013/0197973 | A1 | 8/2013 | Liu et al. |
| 2013/0218427 | A1 | 8/2013 | Mukhopadhyay et al. |
| 2013/0238440 | A1 | 9/2013 | Chatterjee et al. |
| 2013/0316311 | A1* | 11/2013 | England ............... G09B 19/167 434/65 |
| 2014/0006127 | A1* | 1/2014 | DeCook ............. G06Q 30/0208 705/14.17 |
| 2014/0039726 | A1 | 2/2014 | Profitt-Brown et al. |
| 2014/0039988 | A1 | 2/2014 | Londergan et al. |
| 2014/0046701 | A1 | 2/2014 | Steinberg et al. |
| 2014/0058761 | A1 | 2/2014 | Freiberger et al. |
| 2014/0095305 | A1* | 4/2014 | Armitage ........... G06Q 30/0251 705/14.49 |
| 2014/0113619 | A1* | 4/2014 | Tibbitts ................... B60T 8/172 455/419 |
| 2014/0279707 | A1* | 9/2014 | Joshua ............... G06Q 30/0283 701/1 |
| 2014/0309849 | A1* | 10/2014 | Ricci ...................... G06Q 30/00 701/33.4 |
| 2014/0322676 | A1* | 10/2014 | Raman ................. G09B 19/167 434/65 |
| 2015/0005074 | A1 | 1/2015 | Moshayedi |

FOREIGN PATENT DOCUMENTS

| | | |
|---|---|---|
| WO | WO-2010062899 A1 | 6/2010 |
| WO | WO-2013177407 A1 | 11/2013 |

OTHER PUBLICATIONS

Guelph, et al., "The Co-Operators Introduces New Program to Reward Safe Drivers in Ontario Using IMS Technology," Intelligent Mechatronic Systems Inc., May 17, 2014, 2 Pages.

"International: Europe Boards the Telematics Train," Wunelli—Telematics Solutions for Motor Insurance, Dec. 16, 2013, 3 pages.

Ippisch T., "Telematics Data in Motor Insurance: Creating Value by Understanding the Impact of Accidents on Vehicle Use," Dissertation of the University of St. Gallen Graduate School of Business Administration, Oct. 26, 2010, 187 pages.

Tan C., "Changing Driving Behaviour Sans the Stick," The Straits Times, May 16, 2013, 3 Pages.

"Telematics Driving the Automobile Insurance Market Through Disruption," Deloitte, 2012, 12 Pages.

"The New Auto Insurance Ecosystem: Telematics, Mobility and the Connected Car," from Cognizant Reports, Aug. 2012, Retrieved from URL: https://www.cognizant.com/InsightsWhitepapers/The-New-Auto-Insurance-Ecosystem-Telematics-Mobility-and-the-Connected-Car.pdf , pp. 1-14.

"Understanding Car Renewal Premiums," Discovery Insure, Vitality Premium, 2013, 4 pages.

* cited by examiner

INTERACTIVE REWARDS SYSTEM FOR REWARDING DRIVERS

CROSS-REFERENCE TO RELATED APPLICATIONS

This application is a continuation to U.S. patent application Ser. No. 16/436,361, filed Jun. 10, 2019 and entitled "Interactive Rewards System for Rewarding Drivers", which is a continuation of and claims priority to U.S. patent application Ser. No. 14/510,183, filed Oct. 9, 2014 and entitled "Interactive Rewards System for Rewarding Drivers." Each of these applications is incorporated by reference in its entirety herein.

FIELD OF ART

Aspects of the disclosure generally relate to methods and computer systems, including one or more computers particularly configured and/or executing computer software. In particular, this disclosure relates to providing an interactive rewards system, such as a lottery system, for engaging and rewarding drivers.

BACKGROUND

Insurance companies may employ telematics devices installed in vehicles to monitor and analyze driving performance of individuals insured by the insurance companies and other risk-related factors. Based on the data collected by such devices, insurance companies may evaluate the driving behavior of individuals to assess their risk and determine an appropriate insurance cost and premium. In this way, insurance companies may additionally provide benefits to drivers that engage in safe (e.g., positive) driving behaviors. In some conventional approaches, insurance companies may provide benefits based on mileage. The theory behind this approach assumes that when a driver drives less, the driver is less likely to be involved in an accident and thus represents a lower risk. Accordingly, insurance companies may seek to encourage drivers not to drive in conventional practice. As an example, insurance companies may provide benefits based on mileage awarding the most benefits to drivers that drive least.

In other examples, insurance companies may provide benefits for additional safe driving behaviors based on speed, acceleration, braking, steering, and turn signals. For example, drivers may be rewarded for staying within posted speed limits and not often engaging in sudden braking or sharp turning events. Insurance companies may provide lower insurance premiums or discounts to drivers exhibiting good driving behaviors. While this may have helped some insurance companies to reward customers, further methods, devices, software, and systems for attracting, retaining, and rewarding customers are still in demand.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing an interactive rewards system for engaging and rewarding drivers. The disclosure describes a system comprising a first computing device associated with a driver and a second computing device is disclosed, where the second computing device is configured to receive, from the first computing device, driving score information for the driver, assign at least one lottery ticket to the driver based on the driving score information, and send, to the first computing device, a notification indicating that the at least one lottery ticket has been assigned to the driver.

In another embodiment, the system may comprise a first computing device associated with a driver, wherein the first computing device is configured to access driving score information for the driver, assign at least one lottery ticket to the driver, and send a notification to a back-end rewards system indicating that the at least one lottery ticket has been assigned to the driver. The first computing device may be configured to determine if the driver has won a lottery based on the at least one lottery ticket, and the first computing device may notify the back-end rewards system that the driver has won the lottery and to send a reward to the driver for winning the lottery. The back-end rewards system may record the winning and keep a record or reminder to send the reward to the driver for winning the lottery.

The disclosure also describes an apparatus comprising a network interface configured to communicate, via a network, with at least one computing device, and at least one processor. The processor(s) may be configured to cause the apparatus to receive driving score information for a driver, assign at least one game piece to the driver based on the driving score information, and send, to the at least one computing device, a notification indicating that the at least one game piece has been assigned to the driver.

In addition, aspects of this disclosure provide a method that may include receiving, by at least one computing device, driving score information for a driver calculated based on a plurality of driving factors associated with the driver, assigning at least one lottery ticket to the driver based on the driving score information, and sending, to the at least one computing device, a notification indicating that the at least one lottery ticket has been assigned to the driver.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
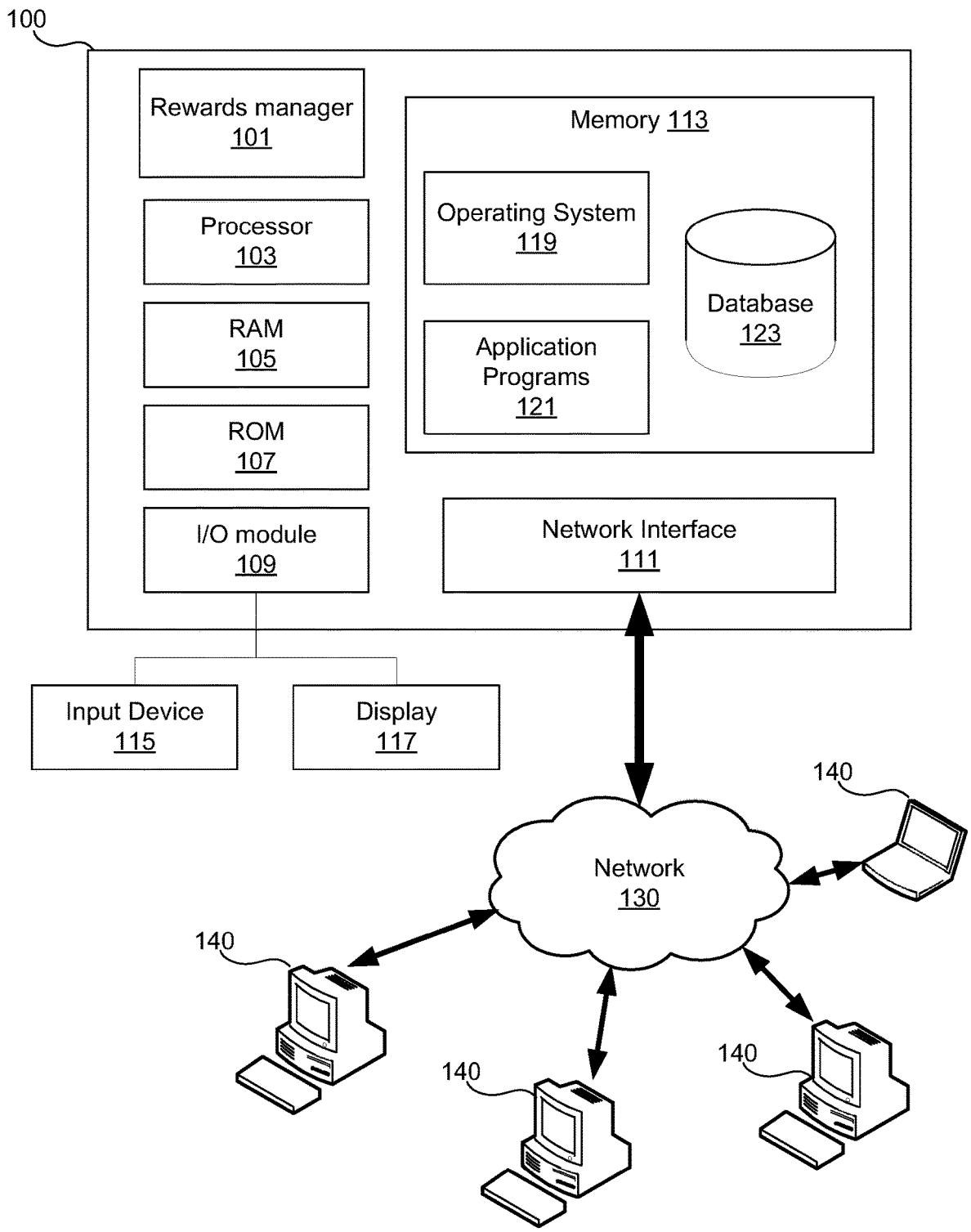
FIG. 1 is a block diagram of an example computing device that may be used according to an illustrative embodiment of the present disclosure.

In accordance with various aspects of the disclosure, methods, computer-readable media, software, and apparatuses are disclosed that provide, an interactive rewards system, such as a lottery system, for receiving driving scores for drivers (e.g., insurance policy holders), determining rewards, assigning lottery tickets and/or game pieces (e.g., playing cards) to drivers, providing games, notifying drivers of winning lottery tickets, and/or redeeming prizes. The interactive rewards system may be integrated across a plurality of platforms. For example, the interactive rewards system may receive driving score information comprising overall driving scores for a driver. The overall driving scores may be calculated from component scores for each of a plurality of driving factors associated with the driver. The plurality of driving factors may comprise speed, braking, steering, turn signals, miles driven, amount of time driven at night, amount of time driven during daytime, etc. The component scores and the overall driving scores may be calculated on a daily, weekly, monthly, or any other periodic basis. In an embodiment, the interactive rewards system may incorporate or interface with a vehicle telematics system so that driving score information representing driving behavior may be collected, calculated, and evaluated. In another embodiment, driving score information may be collected and stored in a database, wherein the database is accessible to the interactive rewards system.

An aspect of the interactive rewards system may include rewarding drivers by assigning one or more lottery tickets to drivers based on the driving score information. The interactive rewards system may identify component score values and overall driving score values and determine a number of lottery tickets to assign to drivers based on the identified values. For example, a predetermined number of lottery tickets may be assigned to the driver if he or she has obtained a driving score value or component score value that is within one or more predetermined score ranges. In an embodiment, if the driver receives a driving score value that is within the score range of 80-89, wherein 100 may be the maximum driving score value, then he or she may be assigned one lottery ticket. In another embodiment, if the driver receives a driving score within the score range of 90-94, then he or she may be assigned two lottery tickets. In another embodiment, if the driver receives a driving score value that is within the score range of 95-100, then he or she may be assigned three lottery tickets. In yet another embodiment, the number of lottery tickets assigned may be the same for all drivers with a driving score value above a predetermined score level.

Furthermore, the interactive rewards system may also assign drivers lottery tickets based on individual driving scores and team driving scores. For example, drivers may receive lottery tickets for achieving certain driving goals (e.g., top driving scores) over certain periods of time (e.g., daily, weekly, monthly). Drivers may also compete against or with other drivers in a team. For example, a driver in a team may win lottery tickets or prizes by beating driving scores of other drivers in the team. Drivers in the team may also work together to compete against other teams in a city, county, state, or country to win lottery tickets or prizes.

The interactive rewards system may also include a gaming system that allows drivers to play games online to earn lottery tickets and/or win other prizes. The gaming system may provide user interfaces for drivers to play a variety of games in competitions against peer drivers or friends. For example, drivers may play card games (e.g., poker) and video games, such as virtual football, virtual chess, virtual first-person shooter games, and virtual role-playing games. In an embodiment, the driver may receive one or more lottery tickets for each game he or she wins. Thus, it may be advantageous for a driver to participate in multiple games online to win more lottery tickets and increase his or her chances of winning the prize in a drawing. Furthermore, the features of a game may be improved for the driver depending on his or her overall driving score values and component score values. In an embodiment, the gaming system may determine a game piece (e.g., playing card) to assign to a driver based on the component score values and overall driving score values. A playing card may be an example of a game piece. It should be understood that other games may be played with other game pieces. For example, the gaming system may determine a card value and card suit for each playing card assigned to the driver in a poker game or another card game based on the component score values and overall driving score values. Once the game piece (e.g., card value and card suit) has been determined, a game piece (e.g., a playing card) may be assigned to the driver, and the driver may be notified by the gaming system of the acquired game piece (e.g., playing card).

In another embodiment, where the game is a virtual sports-related game (e.g., a football video game, soccer video game, etc.), a driver's scores may improve the skill level (or ability) of the players or unlock other players. Also, in the virtual sports-related game, a user may acquire lottery tickets or game pieces for scoring in the game or defeating another team. Still, in another embodiment, where the game is a first-person shooter game, a driver's scores may provide the shooter with additional weapons or health. Also, in the first-person shooter game, a user may acquire lottery tickets for completing certain levels.

Each lottery ticket may indicate an entry into a drawing for a prize, wherein each driver with a lottery ticket has a certain probability of winning the prize. In an embodiment, there may be a variety of prizes or rewards available to drivers. For example, prizes may include discounts on insurance premiums, rebate checks, discounts or rebates on car services, cash, gas credit cards, gift cards, concert tickets, sports tickets, free vacations, travel tickets, hotel vouchers, charity contributions, and other rewards. In another embodiment, the drawing for a prize may occur on a daily, weekly, monthly, annual, or any other periodic basis. The more lottery tickets the driver receives prior to the drawing, the more chances he or she has in winning the prize. Therefore, it may be beneficial for drivers to keep their driving scores values within a certain range and/or above a certain value to maximize the number of lottery tickets they receive.

The lottery system may notify each driver when he or she has been assigned one or more lottery tickets. Additionally, the lottery system may select a winning lottery ticket associated with a driver and send a prize notification to the driver with the winning lottery ticket to indicate that he or she has won the prize in the drawing. The lottery system may incorporate or interface with other insurance systems such as a web portal through which drivers may view their insurance policies, access the lottery system, and redeem rewards. For example, a driver may use a web portal or another interface to redeem a winning lottery ticket and claim a prize. In other embodiments, the driver may be notified of a winning lottery ticket through a mobile device, personal computer, telematics device, or television. The driver may have a predetermined period of time in which he may need to confirm the winning lottery ticket and redeem the prize for the drawing.

In some embodiments, a lottery may be announced or unannounced, wherein drivers may be surprised with rewards or prizes in an unannounced lottery. Moreover, drivers may be unaware of certain driving behaviors and factors which contribute to winning an announced or unannounced lottery. In an embodiment, the interactive rewards system may choose a specific driving factor for which to monitor component scores and randomly select a lottery winner out of the drivers with the highest scores for that specific driving factor. For example, the interactive rewards system may select to reward a driver out of the drivers with the highest scores for night-time driving or for braking.

Additionally, a lottery may be based on teams of drivers (e.g., a team-based lottery). For example, the lottery system may select one or more winning lottery tickets associated with a team of drivers, wherein each driver in the team may win a prize. Drivers in the team may also work together to compete against other teams in a city, county, state, or country to win lottery tickets or prizes.

By implementing these features and more through announced and unannounced lotteries, insurance companies may be able to reward drivers who consistently demonstrate safe driving behaviors. Ultimately, the disclosed interactive rewards system may incentivize drivers to keep up with driving scores and engage in safe driving behaviors by providing drivers with rewards and ways to win and participate through gaming and/or lotteries.

In an embodiment, a driver may be referred to as a user of the interactive rewards system. For example, the driver may use the lottery system to check driving scores, receive lottery tickets, and redeem prizes. The driver may also play various games provided by the gaming system in order to win lottery tickets and prizes. Thus, in another embodiment, a driver may be referred to as a player within the gaming system.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a rewards manager 101 configured to perform methods and execute instructions as described herein. The rewards manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the rewards manager 101 may refer to the software (e.g., a computer program or application) and/or hardware used to assign and manage lottery rewards. Specifically, the rewards manager 101 may be a part of an interactive rewards system that identifies driving score information, assigns lottery tickets, and manages rewards based on driving score information and winning lottery tickets. The one or more specially configured processors of the rewards manager 101 may operate in addition to or in conjunction with another general processor 103 of the computing device 100. In some embodiments, the rewards manager 101 may be a software module executed by one or more general processors 103. Both the rewards manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the interactive rewards system, such as rules for identifying events that trigger the assignment of lottery tickets, rules for determining rewards, rules for managing games associated with the gaming system, and rules for notifying users (e.g., insurance policy holders, drivers) of assigned lottery tickets and rewards. On some computing devices 100, the input devices 115 may be operated by users (e.g., customers) to interact with the rewards system, including providing user information and/or preferences (e.g., preferences related to how and when to receive notifications), keeping track of driving scores, monitoring lottery drawings, checking status of lottery drawings/rewards, redeeming lottery tickets/rewards, etc., as described herein. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 may use the general processor(s) 103 to perform functions of the rewards manager 101, and thus, might not include a separate processor or hardware for the rewards manager 101. Additionally, or alternatively, the computing device 100 may be a mobile device (e.g., a smartphone, tablet, etc.), and thus, may also include various other components, such as a battery, speaker, and/or antennas (not shown). Also, the computing device 100 may be a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.). For example, the computing device 100 could be a vehicle's computer or a device plugged into the vehicle's computer for use in vehicle telematics.

Figure 2:
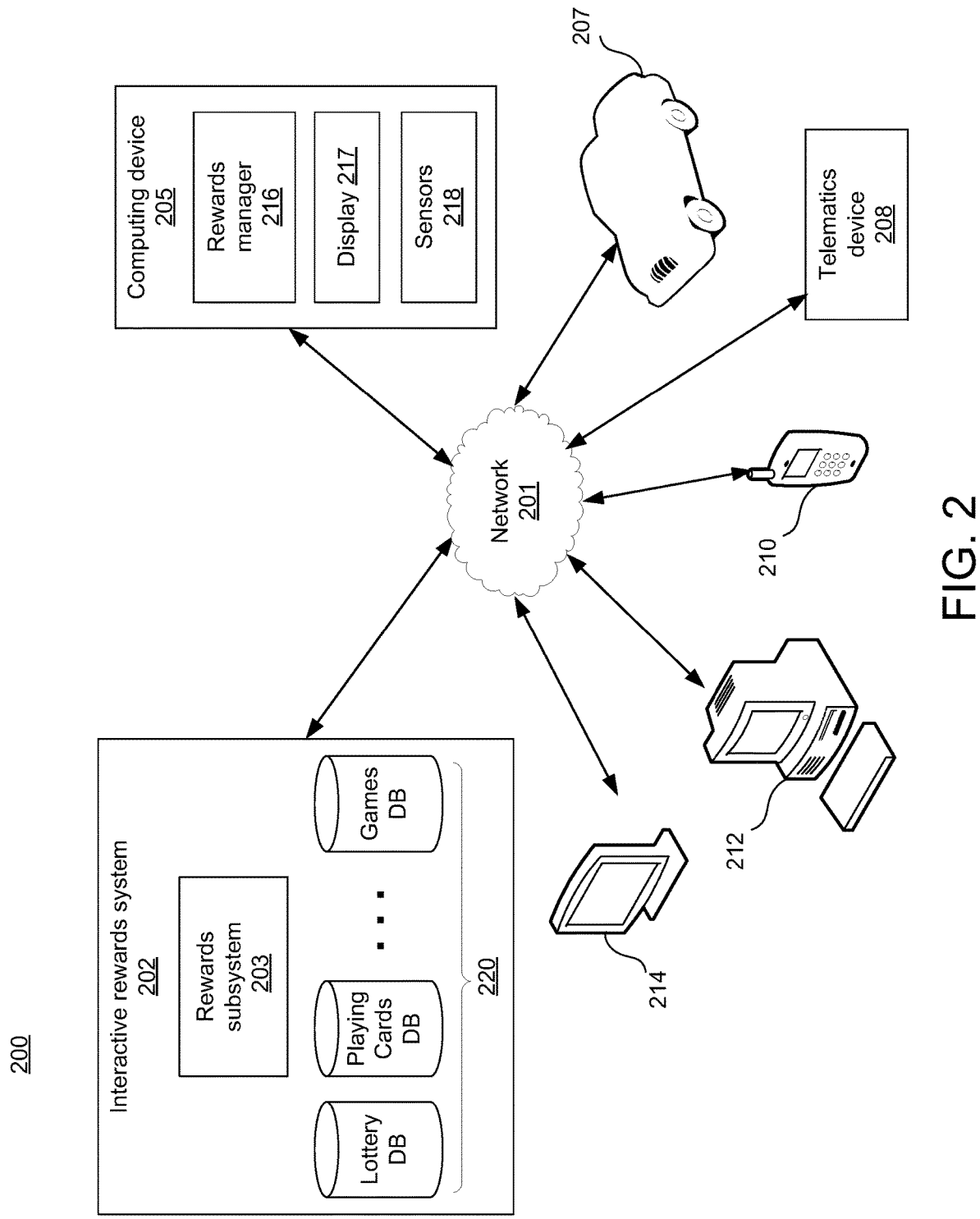
FIG. 2 illustrates an example network environment in which a system in accordance with the present disclosure may be implemented.

The methods and software for an interactive rewards system for rewarding drivers as disclosed herein may be implemented on one or more computing devices 100 used in various network environments. FIG. 2 illustrates an example network environment 200 for implementing methods according to the present disclosure. As shown in FIG. 2, the network environment 200 may include a network 201 configured to connect an interactive rewards system 202, computing device 205, vehicle 207, telematics device 208, mobile device 210, customer computing device 212, and television 214. Collectively, these computing devices may form at least a part of an interactive rewards system, such as a lottery system and/or gaming system. Although only one of each of the components 205, 207, 208, 210, 212, and 214 are shown in FIG. 2, it is understood that there may be any number of components 205, 207, 208, 210, 212, and 214 in the network environment 200.

The network 201 may be any type of network, like the network 130 described above, and use one or more communication protocols (e.g., protocols for the Internet (IP), Bluetooth, cellular communications, satellite communications, etc.) to connect computing devices and servers within the network environment 200 so they may send and receive communications between each other. In particular, the network 201 may include a cellular network and its components, such as cell towers. Accordingly, for example, a mobile device 210 (e.g., a smartphone) or a computing device 205 of a person in vehicle 207 may communicate, via a cellular backhaul of the network 201, with an interactive rewards system 202 to report driving score information representing driving behaviors of a driver of the vehicle 207. And, in the opposite direction, the interactive rewards system 202 may communicate, via the cellular backhaul of the network 201, with the mobile device 210 or computing device 205 to notify a user of the mobile device 210 or computing device 205 of an assigned lottery ticket. In another embodiment, the mobile device 210 or computing device 205 may communicate back and forth with the interactive rewards system 202 over the Internet, such as through a web portal. As shown in FIG. 2, it should be understood that the mobile device 210 or computing device 205 may connect to the network 201 even if it is removed from the vehicle 207.

The vehicle 207 may be, for example, the vehicle of a driver or customer of an insurance company or a vehicle covered by an insurance policy of an insurance company. Although FIG. 2 illustrates only one vehicle 207, the interactive rewards system may be configured to communicate with multiple vehicles 207 simultaneously, wherein the multiple vehicles 207 may be associated with multiple drivers. The lottery system may receive driving score information simultaneously, assign lottery tickets to different drivers simultaneously, and notify drivers of lottery tickets/rewards simultaneously. Also, although FIG. 2 depicts the vehicle 207 as a car, the vehicle 207 may be any type of vehicle, including a motorcycle, bicycle, scooter, drone (or other automated device), truck, bus, boat, plane, helicopter, etc.

The driver of the vehicle 207 may be associated with a computing device 205. In an embodiment, the computing device 205 may be a mobile device, a tablet, laptop, personal computer, etc. For example, the computing device 205 may be the same as the mobile device 210 depicted in FIG. 2. The computing device 205 may belong to a driver or customer of an insurance company who is enrolled in a service that allows the driver to participate in a lottery to obtain rewards based on his or her driving behavior. The computing device 205 may further comprise a rewards manager 216, a display 217, and sensors/modules 218.

The computing device 205 may be configured to execute the rewards manager 216 that presents a user interface (e.g., a graphical user interface for a website, application, software program, etc.) on the display 217. The display 217 may comprise a monitor, television, touchscreen, etc. The user interface of the rewards manager 216 may allow drivers to monitor driving score information, receive notifications of lottery tickets, play games to earn lottery tickets, and redeem lottery tickets for rewards/prizes as provided by the interactive rewards system 202. The rewards manager 216 may be a self-sufficient program or may be a module of another program, such as a program used to collect and/or evaluate driving score information representing actions of a vehicle 207 and/or driving behavior of a driver of a vehicle 207. The rewards manager 216 may have access to drive data that is collected by the sensors 218 of the computing device. The sensors 218 may comprise various sensors and/or modules that detect driving behaviors, environmental information, and/or other risk-related factors of a driver of a vehicle 207. For example, the sensors 218 may comprise an accelerometer, GPS, gyroscope, etc. In an embodiment, the sensors 218 may detect environmental information and/or other risk-related factors such as weather conditions, angle of the sun, road conditions based on the weather, whether or not other passengers are in the vehicle, and the like.

In an embodiment, the rewards manager 216 may be downloaded or otherwise installed onto the computing device 205 using known methods. Different devices may install different versions of the rewards manager 216 depending on their platform. For example, a computing device 205 (e.g., a smartphone) running the iOS™ operating system may download a different version of the rewards manager 216 than a computing device 205 running the ANDROID™ operating system.

A driver may launch the rewards manager 216 by, for example, operating buttons or a touchscreen on the computing device 205. Additionally, or alternatively, the computing device 205 may be configured to execute a web browser (e.g., an application for accessing and navigating the Internet) to access a web page providing an interface for the lottery system and/or gaming system. In some embodiments, the computing device 205 may also be configured to collect driving score information. For example, the rewards manager 216 or another program installed on the computing device 205 may instruct the computing device 205 to collect drive data using the sensors 218 (e.g., its accelerometer, GPS, gyroscope, etc.). Drive data may include vehicle telematics data or any other data related to events occurring during a vehicle's trip (e.g., an impact to a part of the vehicle, a deployed airbag, etc.). Drive data may also include location information, such as GPS coordinates, indicating the geographical location of the computing device 205, or weather conditions, or other risk-related factors. The rewards manager 216 or another program installed on the computing device 205 may calculate driving score information, including overall driving scores and component scores from the collected drive data.

A driver associated with the computing device 205 may employ the rewards manager 216 to access his or her driving score information and calculate or estimate a rebate check the driver may earn. In an embodiment, a driver may estimate a rebate check he or she may receive from an insurance company based on his or her driving behaviors. For example, the driver may use the rewards manager 216 to determine how his or her rebate may be increased by improving specific driving behaviors, such as by decreasing his or her night-time driving and reducing the number of miles driven daily. In an embodiment, a rebate check may be presented to a driver periodically (e.g., every month), wherein the rebate check may be set at a certain amount at the beginning of the period (e.g., beginning of the month). The amount of the rebate check may be reduced throughout the month with respect to decreases in the driver's driving score, and the driver may be notified of the changes in the rebate check by the rewards manager 216.

The rewards manager 216 may also provide a calculator tool in which drivers may predict or evaluate how different driving behaviors may affect driving scores, rebate checks, lottery tickets, and rewards. In another embodiment, a calculator tool may use a driver's analyzed behavior to suggest ways to change driving behavior for maximum premium reduction/safety improvement. The calculator tool may be implemented as a module within the same program used to implement the rewards manager 216. In an embodiment, the driver may also calculate his or her driving score information and a predetermined number of lottery tickets he or she may be assigned based on the driving score information entered into the calculator tool provided by the rewards manager 216. For example, the calculator tool may show a breakdown of the driving score information (e.g., algorithms used to calculate overall driving scores and component scores), wherein drivers may be informed of which driving behaviors they may need to work on in order to improve their driving scores, check rebates, and/or the number of lottery tickets earned.

Additionally, FIG. 2 also illustrates a telematics device 208 connected to the network 201. In an embodiment, the telematics device 208 may be referred to as a vehicle computing device 208 that is associated with the vehicle 207 and the mobile device 210.

In some embodiments, the mobile device 210 and vehicle computing device 208 may communicate with one another (e.g., via Bluetooth). The mobile device 210 may be any mobile device (e.g., a smartphone, tablet, etc.) that is associated with a driver or passenger of the vehicle 207. In particular, the mobile device 210 may belong to a driver or a customer of an insurance company who is enrolled in a service that allows the driver to obtain rewards based on his or her driving behavior. The mobile device 210 may be configured similarly to the computing device 205 and may interface with the vehicle computing device 208.

The vehicle computing device 208 may be configured to execute a rewards manager that presents a user interface for a customer to provide inputs to and receive outputs from the interactive rewards system. The rewards manager may be downloaded or otherwise installed onto the vehicle computing device 208 using known methods. Once installed onto the vehicle computing device 208, a user may launch the rewards manager by, for example, operating buttons or a touchscreen on the dashboard of the vehicle 207. Additionally, or alternatively, the vehicle computing device 208 may be configured to execute a web browser to access a web page providing an interface for the interactive rewards system.

In some embodiments, the vehicle computing device 208 may be a device that is plugged into the vehicle's 207 on-board diagnostic (OBD) system (e.g., plugged in through an OBD II connector) or otherwise installed in the vehicle 207 in order to collect drive data using, e.g., its accelerometer, GPS, gyroscope, or any other sensor (either in the device 208 or the vehicle 207). As mentioned above, this drive data may include vehicle telematics data or any other data related to events occurring during a vehicle's trip (e.g., an impact to a part of the vehicle, a deployed airbag, or other event triggered by a sensor of the vehicle 207). The vehicle 207 may have a GPS installed therein, and therefore, the vehicle computing device 208 may also collect GPS coordinates.

Further, the vehicle computing device 208 may be a system including multiple devices. For example, the vehicle computing device 208 may include the vehicle's OBD system and other computers of the vehicle 207. The vehicle computing device 208 may be configured to interface with one or more vehicle sensors (e.g., fuel gauge, tire pressure sensors, engine temperature sensors, etc.). The vehicle computing device 208 may also interface with the mobile device 210 via a wired connection (e.g., USB, OBD II connector, etc.) or a wireless connection (e.g., Bluetooth). In some embodiments, there might not be a vehicle computing device 208 installed in the vehicle 207 that is configurable to interface with the interactive rewards system, or the vehicle computing device 208 might not be able to communicate with the mobile device 210. Still, in some cases, the vehicle computing device 208 might be configured so that it only communicates with the mobile device 210 within the same vehicle 207.

In an embodiment, both a vehicle computing device 208 and a mobile device 210 (or a computing device 205) may be employed, whereas in another embodiment, only one of these devices may be used with the interactive rewards system to collect drive data. For example, a user (e.g., insurance policy holder) may choose whether she wishes to use her mobile phone to capture driving drive data or whether she wishes to have a device plugged into her vehicle 207 to collect drive data.

FIG. 2 also illustrates an example subsystem within the network environment 200. That is the interactive rewards system 202 may comprise a rewards subsystem 203 and a plurality of databases 220. The rewards subsystem 203 may include one or more application servers, computing devices, and other equipment used by company (e.g., insurance company) personnel to implement the features described herein. For example, the rewards subsystem 203 may include a lottery tickets module which may include any computing device 100 configured to execute a rewards management program or module thereof (e.g., a computing device 100 with the rewards manager 101). The lottery tickets module may be configured to assign lottery tickets and randomly select a winning lottery ticket in a drawing for a reward. Further, the rewards subsystem 203 may comprise a gaming system. The gaming system may include a plurality of gaming modules, which may be configured to provide gaming interfaces to users.

The rewards subsystem 203 may provide access and maintain records related to assigning lottery tickets, selecting lottery ticket winners, and redeeming rewards. For example, the rewards subsystem 203 may receive driving score information for one or more drivers from the computing device 205, vehicle computing device 207, and/or mobile device 210. In an embodiment, driving score information may be transferred to the rewards subsystem 203 over a cellular network (e.g., network 201). In another embodiment, the driving score information may be directly uploaded to a machine in the rewards subsystem 203 by a wireless connection (e.g., Bluetooth) or by a wired connection (e.g., USB drive) between the machine and the computing device 205, vehicle computing device 207 or mobile device 210. After receiving the driving score information, the rewards subsystem 203 may then process and evaluate the driving score information and assign one or more lottery tickets to the one or more drivers based on the driving score information.

In order to assign lottery tickets, the rewards subsystem 203 may identify overall driving scores and component scores based on a plurality of driving factors for each driver. The overall driving scores may be calculated from component scores for each of a plurality of driving factors associated with the driver. As previously mentioned, the plurality of driving factors may comprise speed, braking, steering, turn signals, miles driven, amount of time driven at night, amount of time driven during daytime, weather conditions, etc. The component scores and the overall driving scores may be calculated and sent to the rewards subsystem 203 on a daily, weekly, monthly, or any other periodic basis. Table 1 below summarizes an example of lottery ticket assignment based on driving score information.

TABLE 1

| Driving Score Ranges | Lottery Tickets Assigned |
| --- | --- |
| i. Score range 95-100 | i. 4 lottery tickets |
| ii. Score range 90-94 | ii. 3 lottery tickets |
| iii. Score range 85-89 | iii. 2 lottery tickets |
| iv. Score range 80-84 | iv. 1 lottery ticket |

In an embodiment, a predetermined number of lottery tickets may be assigned to a driver by the rewards subsystem 203 if he or she has obtained a driving score value or component score value that is within one or more predetermined score ranges. For example, if the driver receives a driving score value that is within the score range of 80-89, wherein 100 may be the maximum driving score value, then he or she may be assigned one lottery ticket. If the driver receives a driving score within the score range of 90-94, then he or she may be assigned two lottery tickets. If the driver receives a driving score value that is within the score range of 95-100, then he or she may be assigned three lottery tickets. In another embodiment, the number of lottery tickets assigned by the rewards subsystem 203 may be the same for all drivers with a driving score value above a predetermined score level. In yet another embodiment, the number of lottery tickets awarded may exponentially increase as the driver's driving score increases. In another embodiment, more tickets may be assigned based on how well a driver does compared to other drivers (or any subset of drivers).

The rewards subsystem 203 may also assign a driver additional lottery tickets for improving his or her driving scores or beating a previously obtained insurance score. For example, a driver may typically achieve overall driving scores within an 80-85 range, wherein the maximum driving score is 100. If the driver beats his personal best driving score of 85 with a new high driving score of 88, then the rewards subsystem 203 may assign an additional lottery ticket to the driver for beating his previous driving score.

Moreover, lottery tickets may be assigned to drivers by the rewards subsystem 203 based on reaching certain driving milestones or goals. In an embodiment, a driver may earn at least one lottery ticket or a reward if he or she achieves a top score for a predetermined number of times in a row. The top score may be a top daily score, a top weekly score, or a top monthly score, wherein the top score comprises at least one of an overall driving score or component score. For example, a driver may receive at least one lottery ticket for beating a personal best driving score and achieving a top daily score for three days in a row. In another example, a driver may receive at least one lottery ticket for achieving a top weekly score four times in a row. In yet another example, a driver may receive at least one lottery ticket for achieving a top monthly score five times in a row. If a driver achieves a top daily score, a top weekly score, and a top monthly score all within the same month, the driver may receive at least one lottery ticket or a prize for his or her driving accomplishment.

The rewards subsystem 203 may assign lottery tickets to drivers based on individual driving scores, as well as based on team driving scores. For example, a driver may compete against or with a team of drivers, wherein the drivers in the team may be selected by or assigned to the driver by the rewards subsystem 203. The driver may select his or her friends to be in his or her team of drivers with whom he or she may compete. In an embodiment, a team may comprise 5 drivers, 10, drivers, 15 drivers, 20 drivers, or any other number of drivers. A driver may earn lottery tickets by obtaining the highest driving scores (e.g., top scores) with respect to his or her team. The driver may also work with the team to compete against other teams in a city, county, state, or country to win lottery tickets or prizes. For example, each team may be ranked based on team average driving scores and put into percentile groups against other teams around the city, county, state, or country. The rewards subsystem 203 may notify a team if their team average driving score is among the top scores in the city, county, state, or country (e.g., top 10 scores, top 100 scores, etc.). One or more teams may be selected to win prizes based on their team average driving scores. In an embodiment, a potential prize may increase by value each week that over a certain percentage (e.g., 80%) of the drivers in the team maintains overall driving scores above a predetermined score level or within a predetermined score range. This feature may incentivize drivers in the team to maintain safe driving behaviors and keep up with their driving scores.

Additionally, the rewards subsystem 203 may include functionality that may be distributed among a plurality of computing devices. For example, the rewards subsystem 203 may comprise further subsystems, including client-side subsystems and server-side subsystems. The client-side subsystems may interface with the computing device 205, vehicle computing device 207, and/or mobile device 210, whereas the server-side subsystem may interface with application servers and computing devices which handle a variety of tasks related to the access, assignment, and management of lottery-based rewards. In another embodiment, the rewards subsystem 203 may include a gaming system comprising additional subsystems and/or servers for each of a variety of games employed by the rewards subsystem 203. The gaming system may allow drivers to play a variety of games online to earn lottery tickets (and/or game pieces) and win other prizes in an announced lottery. The gaming system may provide, e.g., through a web portal, user interfaces (e.g., web pages) presented on the display 217 of the computing device 205 in which the driver may check driving scores, calculate rebates/rewards, play games, and compete against peer drivers or friends. The variety of games may include card games, such as poker, and video games, such as virtual football, virtual chess, virtual first-person shooter games, and virtual role-playing games (RPG).

Drivers may select a group of peer drivers or friends with whom to play a particular game. In an embodiment, the group may comprise 2 drivers, 5 drivers, 10 drivers, 15 drivers, or any number of drivers. Within the group, drivers may compete against each other to win a lottery ticket or a prize. The competition may last any predetermined period of time, such as a few days or a week long. For example, in a poker game, each driver may have an opportunity to gather a hand of playing cards each day of a week. At the end of the week, the driver with the highest ranking hand of playing cards may win a lottery ticket or a prize for the week. Alternatively, when each player has at least a set amount of cards (e.g., two cards), the players may play a round of poker. Players that have earned more playing cards may have a better chance of winning the round. In another embodiment, each driver in the poker game may bet an item on his or her respective hand of playing cards, wherein the items bet include items provided to drivers in the poker game upon reaching a certain level of the game. For example, each driver with a pair of playing cards or a better hand may be given a $5 gas credit card or a gift card. These drivers may then bet their gas credit cards or gift cards in the poker game, with the winner of the highest ranking hand of playing cards winning the gas credit cards or gift cards that were bet by the other drivers. The winner of the highest ranking hand of playing cards may also win a lottery ticket or prize in addition to the betted winnings. Bets may be placed by drivers in the poker game at any time (e.g., before or after driving scores are determined).

In some embodiments, features of a game may be determined based on a driver's overall driving score values and component score values. For example, the gaming system may determine a card value and card suit for each playing card assigned to the driver in a poker game or another card game (e.g., "UNO", "go fish," etc.) based on the component score values and overall driving score values. The card values and card suits may be important for ranking hands of playing cards and ultimately determining the winning hand in a poker game. In some embodiments, driving score values and component score values may be grouped into four predetermined score ranges to correspond to four different card values. For example, 100 may be the maximum driving score value, and the four predetermined score ranges, in order of weakest to strongest card values, may be 80-84, 85-89, 90-94, and 95-100. Thus, in an embodiment, the driver may need to score above 80 to qualify for a playing card. If the driver scores below 80, then he or she might not receive a playing card. In order for drivers to receive new playing cards, the driving score values and component score values may be calculated on a daily basis to determine which new playing cards, if any, may be assigned/awarded to the drivers.

Additionally, driving scores and component scores may be divided into different card suits. For example, card suits may include the following, in order of strongest to weakest card suits: overall driving score, braking score, turn signals score, night-time driving score, daytime driving score, and other component scores. In an embodiment, the overall driving score may be a weighted average of each of the component scores and may be the strongest card suit. Various algorithms may be employed by the rewards manager 216 or another program installed on the computing device 205 to calculate the component scores and the overall driving scores. In an embodiment, a playing card with a stronger card suit may win over a playing card with a weaker card suit. For example, a playing card with an overall driving score suit may win over a playing card with a daytime driving suit. Similarly, a playing card with a stronger card value may win over a playing card with a weaker card value. For example, a playing card with a score range of 95-100 may win over a playing card with a score range of 80-84.

Table 2 below summarizes examples of different card values and card suits, listed from strongest to weakest, which may be utilized in a poker game. The values and suits may be adjusted based on their effect on driving safety. For example, if it is found that night-time driving scores have a stronger impact on driving safety than turning scores, then that suit may become a stronger suit.

TABLE 2

| Card Values | Card Suits |
| --- | --- |
| i. Score range 95-100 | i. Overall driving score |
| ii. Score range 90-94 | ii. Braking score |
| iii. Score range 85-89 | iii. Turning score |
| iv. Score range 80-84 | iv. Night-time driving score |

Once the card value and card suit have been determined, the gaming system may assign a playing card to the driver, and the driver may construct different hands of playing cards. In an embodiment, the poker game may be played with a Texas Hold'em twist, wherein two cards (e.g., hole cards) may be presented to each driver in the game. The two cards may be used to construct a hand of playing cards in the poker game. In an embodiment, the driver may have an opportunity to gather a hand of playing cards each day of a week for a standard poker game or a poker game with a Texas Hold'em twist. At the end of the week, the driver with the highest hand of playing cards wins a lottery ticket or prize for the week. In an embodiment, certain hands of playing cards may be stronger (e.g., rank higher) than other hands of playing cards. For example, the highest ranking hand of playing cards may be a five-of-a-kind including five "overall driving score" cards each having a card value with a score range of 95-100. In another embodiment, a lower ranking hand of playing cards may be a pair of "night-time driving score" cards each having a card value with a score range of 80-84. Ultimately, the hand of playing cards with the strongest card values and/or strongest card suits may win the card game. For example, a hand of four of a kind may beat a hand of three of a kind, whereas a hand of five of a kind may beat both hands. Other hands that are conventionally played in poker may also be played, such as a straight flush, full house, straight, and other hands In some embodiments, a traditional poker game may be played with conventional card values and card suits. For example, conventional card values may include Ace, King, Queen, Jack, ten, nine, eight, seven, six, five, four, three, two, and/or Joker, whereas conventional card suits may include hearts, diamonds, clubs, and spades. In an embodiment, the gaming system may determine how many playing cards to give to a player based on driving score information. For example, 1 playing card may be given for driving scores within an 80-84 range, 2 playing cards may be given for driving scores within an 85-89 range, 3 playing cards may be given for driving scores within a 90-94 range, and 4 playing cards may be given for driving scores within a 95-100 range. The gaming system may randomly select a card suit (e.g., hearts, diamonds, clubs, spades) and randomly select a card value (e.g., Ace, King, Queen, Jack, ten, nine, eight, seven, six, five, four, three, two, Joker) for each card earned by a driver. The gaming system may then assign the playing card with the selected suit and card value to the driver. After a certain period of time (e.g., after a week or after each driver at the virtual poker table has obtained a set number of playing cards, such as two playing cards for Texas Hold'em), then the drivers may play a round of traditional poker with their playing cards.

In order to win a game, a driver may need a highest ranking hand of playing cards. In an embodiment, if none of the drivers participating in the poker game are able to construct a hand of playing cards, then the driver with the highest overall driving score may win the game. In another embodiment, if two or more drivers present the same hand of playing cards, the driver with the highest score within that hand may win the game. Additionally or alternatively, drivers may collect different game pieces or accumulate one type of game piece to win the game. The gaming system may rank drivers on a scoreboard based on the number of times a driver has won the game. For example, drivers who have won the most games may be ranked on top of the scoreboard, wherein the scoreboard may be included in the user interface of the poker game (e.g., shown on the display 217 of the computing device 205).

Still referring to FIG. 2, in some embodiments, each of the additional subsystems and/or servers employed by the gaming system in the rewards subsystem 203 may store and maintain data associated with a specific game (e.g., player information, points won, levels reached in the game, etc.). The additional subsystems and/or servers may send the data associated with each of the games to the rewards subsystem 203 in order to assign corresponding lottery tickets to drivers.

The subsystems, application servers, and computing devices of the rewards subsystem 203 may also have access to the plurality of databases 220. In an embodiment, the plurality of databases 220 may be incorporated into the rewards subsystem 203 or may be separate components in the rewards subsystem 203. As an example, the plurality of databases 220 may comprise a lottery database, a game pieces database, a playing cards database, a games database, and other rewards databases. Each database 220 may comprise information regarding the assignment of lottery tickets, insurance policy information, driving scores, rewards, and/or gaming information (e.g., assignment of cards) for each driver participating in the lottery. The data stored in the plurality of databases 220 may be collected and compiled by the computing device 205, the vehicle computing device 207, the rewards subsystem 203, or by servers and subsystems within the rewards subsystem 203. The databases 220 may also store various rules. For example, the games database 220 may store rules for a card game.

Furthermore, the rewards subsystem 203 may also be employed to select a driver to win a prize in a lottery drawing. Each lottery ticket may indicate an entry into a drawing for a prize, wherein each driver with a lottery ticket may have a certain probability of winning the prize. For example, a driver with one lottery ticket may have a 1 in 20 chance (5% chance) of winning the prize. A winner of the drawing may be randomly selected by the rewards subsystem 203, wherein the rewards subsystem 203 may apply various algorithms to make the random selection. In an embodiment, the drawing might not need to be from among all drivers, but may purely be based on probability (e.g., drawing by a random number generator). Alternatively, for example, each lottery ticket may be given a 1 in 20 chance of being drawn for a prize. In an embodiment, there may be a set of 20 in a drawing, wherein there may be 1 win and 19 losses assigned in a random order. For example, a win in the set of 20 may be assigned as the fifth ticket in the set of 20. Thus, a driver may win on the $5^{th}$ ticket that he earns but lose on the other 19 tickets that he earns. This 1 in 20 chance approach may be repeated for the next 20 tickets and so forth. Therefore, in some embodiments, none, one, or multiple tickets may win the prize based on this probability.

In an embodiment, there may be multiple prizes available in a lottery drawing, wherein there may be multiple drivers selected randomly to win prizes in the lottery drawing. For example, the rewards subsystem 203 may select multiple lottery tickets for multiple winners in a drawing, wherein each of the lottery tickets may be associated with a different driver. Each of the winners may receive the same prize or different prizes. Moreover, there may be a variety of prizes or rewards awarded to drivers with winning lottery tickets. In an embodiment, prizes may include discounts on insurance premiums, rebate checks, discounts or rebates on car services, cash, gas credit cards, gift cards, concert tickets, sports tickets, free vacations, travel tickets, hotel vouchers, charity contributions, and other rewards. In another embodiment, there may be small (e.g., relatively low value) prizes for daily lottery drawings, as well as large (e.g., relatively high value) prizes for weekly or monthly lottery drawings. For example, the small prizes for the daily lottery drawings may include small gas credit cards, gift cards, and small discounts on insurance (e.g., $5-10 off insurance premium for next renewal period), whereas the large prizes for the weekly or monthly lottery drawings may include gas credit cards and gift cards with larger values, concert tickets, sports tickets, discounts or rebates or car services, larger discounts on insurance (e.g., $100 off insurance premium for next renewal period), free vacations, travel tickets, and hotel vouchers.

In an embodiment, the rewards subsystem 203 may randomly select a winning lottery ticket associated with a driver to win a prize in a lottery drawing. The rewards subsystem 203 may notify the driver by sending a prize notification indicating that the winning lottery ticket has been selected for the driver to win the prize in the lottery drawing. In an embodiment, the driver may be notified of winning lottery tickets by receiving the prize notification at one or more of the following devices: computing device 205, mobile device 210, vehicle computing device 208, customer computing device 212, and television 214. For example, the driver may receive a prize notification through the rewards manager 216 on the computing device 205 The prize notification may be presented on the display 217 and may comprise a message or an indication (e.g., text, images, video, animation, etc.) informing the driver of his winning lottery ticket and the prize that the driver has won.

In another embodiment, the driver may access the rewards subsystem 203 and receive the prize notification through a web portal available through the customer computing device 212 shown in FIG. 2. The customer computing device 212 may be any computing device used by a customer of, for example, an insurance company to execute a web browser to access a lottery rewards website. For example, the customer computing device 212 may be a desktop computer, laptop, tablet, etc. that a customer uses to execute a web browser or other application to sign up for a rewards program, review rewards, indicate preferred forms of rewards, indicate when and how she wishes to be notified of rewards, redeem rewards, transfer rewards, and pool rewards. The customer computing device 212 may be a driver's personal computer at home, and the driver may log on a website and check to see if he or she has won. The website may list one or more winners for a plurality of lottery drawings in the rewards subsystem 203. For example, the website may be a general website for the insurance company, a website specific to the rewards subsystem 203, or a social media website (e.g., FACEBOOK page). In yet another embodiment, the television 214 shown in FIG. 2 may be employed to notify drivers of winning lottery tickets. For example, the driver may watch the television 214 to check to see if he or she has won the prize for the lottery drawing. The one or more winners for the lottery drawing may be declared on a program or commercial shown on the television 214. In some embodiments, the driver may be notified of a winning lottery ticket by email, text messages (e.g., SMS, MMS, etc.), push notifications, and phone calls on his or her mobile device (e.g., mobile device 210).

Once the winners have been disclosed by any of the aforementioned methods, a driver with a winning lottery ticket may redeem his or her prize by accessing the rewards subsystem 203 through a web portal on the computing device 205, mobile device 210, vehicle computing device 208, or customer computing device 212. In an embodiment, the driver may use a web portal or another interface to redeem the winning lottery ticket and claim the prize. For example, the driver may log online to confirm that he or she has the winning lottery ticket and to claim the prize. In order to confirm the winning lottery ticket, the driver may input his or her user information (e.g., username, password), enter in his or her contact information (e.g., address, phone number, email address), and/or enter a passcode (which may have been provided to the driver with the prize notification) to receive the prize. The rewards subsystem 203 may subsequently receive a message indicating that the driver has redeemed the winning lottery ticket to claim the prize.

In an embodiment, the driver with the winning lottery ticket may have a certain period of time in which to redeem the winning lottery ticket and claim the prize. For example, the driver may have a day, a week, a month, or another predetermined period of time to confirm his winning ticket. If the driver does not confirm his winning ticket and redeem the prize within the predetermined period of time, then the prize may be available for the next drawing. That is, the prize may be awarded as the prize for the next drawing or the prize may be added to the next drawing's prize (e.g., the prize may be rolled forward). For example, if the driver fails to claim and redeem his prize of a free vacation, then the rewards subsystem 203 may offer the same prize of the free vacation in the next drawing. In another example, if the driver fails to redeem his prize for a discount of $100 off insurance premium in a monthly drawing, then the prize in the next month's drawing may include the previous month's discount, with the prize totaling up to a discount of $200 off insurance premium. In another embodiment, the rewards subsystem 203 may reward an unredeemed prize to a second driver by randomly selecting a second lottery ticket in the drawing. This second driver may also have a similar predetermined period of time in which to confirm his winning ticket and redeem the prize. In an embodiment, the lottery system may continue to select drivers randomly until a driver confirms the winning ticket and redeems the prize.

Additionally, there may be a plurality of ongoing lottery drawings in the rewards subsystem 203, wherein the drawings may be for announced or unannounced lotteries. In an announced lottery, drivers may be aware of the lottery prize and the drawing date for the winning lottery ticket. Drivers may knowingly earn as many lottery tickets as they can to improve their chances in winning the announced lottery. In an unannounced lottery, drivers may be unaware of the lottery and not know of the drawing date for the winner of the lottery. Thus, drivers may be surprised with rewards or prizes in the unannounced lottery. Drivers may also be unaware of certain driving behaviors and unknown factors which contribute to winning the lottery (e.g., announced lottery or unannounced lottery). In an embodiment, the rewards subsystem 203 may choose a specific driving factor for which to monitor component scores and randomly select an unannounced lottery winner out of the drivers with the highest scores for that specific driving factor. For example, the lottery system may select to reward a driver out of the drivers with the highest scores for night-time driving or for braking. In an embodiment, the unannounced lottery may be separate from the announced lottery. Both unannounced and announced lotteries may encourage drivers to drive safely. The announced lotteries may give people concrete goals while the unannounced lotteries provide surprise, delight, and even a desire to uncover all possible ways to win the unannounced lottery.

Figure 3:
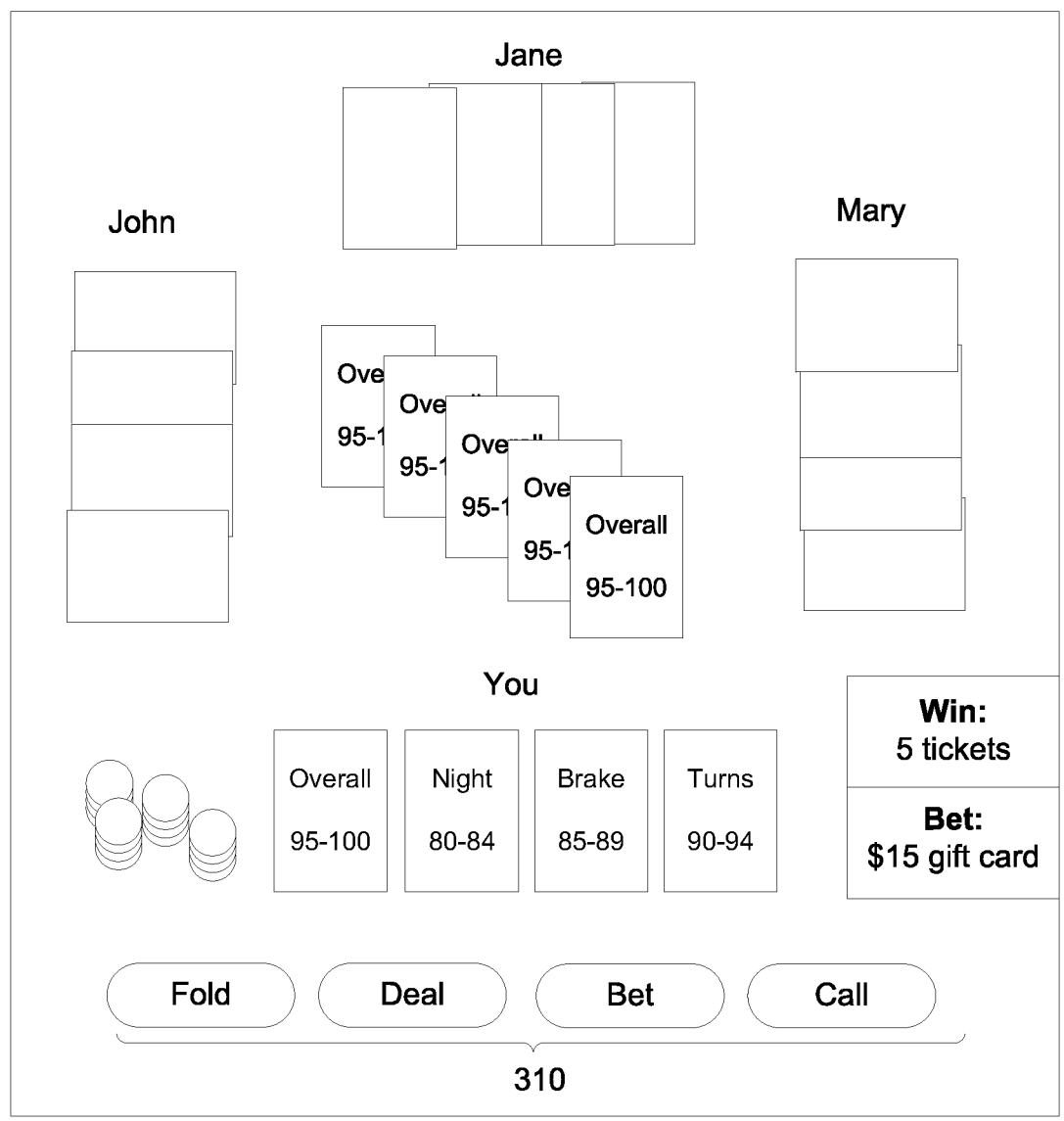
FIG. 3 is a diagram illustrating an example of a user interface in accordance with aspects of the present disclosure.

FIG. 3 is a diagram illustrating an example of a user interface 300 in accordance with aspects of the present disclosure. The user interface 300 depicts a poker game that may be managed by a gaming system within the rewards subsystem 203. In an embodiment, the user interface 300 may be shown on the display 217 of the computing device 205, wherein the computing device 205 may be a mobile device (e.g., mobile device 210), tablet, laptop, or a personal computer (e.g., customer computing device 212). The poker game illustrated in FIG. 3 shows a game occurring between four players or drivers (e.g., John, Jane, Mary, and the driver using the computing device 205). Each of the players may be insurance policy holders participating in the interactive rewards system at an insurance company. Alternatively, a subset of the players (e.g., a single player) may be insurance policy holders (who have earned their cards through driving), while the remaining players might not be insurance policy holders. In an embodiment, there may be any number of players in a game managed by the gaming system. In FIG. 3, four players may be participating in the poker game, wherein the respective playing cards of each player viewing the interface may be visible just to that respective player. Although only four playing cards are shown for each of the players, each player may have any number of playing cards.

In an embodiment, the card suits and the card values of the playing cards may be depicted in any manner, such as by text or by symbols that represent the specific suits and values. For example, the card suits shown previously in Table 1 may be depicted as conventional symbols used in poker games (e.g., hearts, diamonds, clubs, and spades). In an embodiment, hearts may represent a suit of overall driving scores, diamonds may represent a suit of braking scores, clubs may represent a suit of turn signals scores, and spades may represent a suit of night-time driving scores.

Additionally, the card values may be represented as single numbers to simplify the poker game interface for players. In an embodiment, the card value of 95 may represent the score range of 95-100, the card value of 90 may represent the score range of 90-94, the card value of 85 may represent the score range of 85-89, and the card value of 80 may represent the score range of 80-84.

As depicted in FIG. 3, the cards shown in the center of the user interface 300 may represent a winning hand of playing cards. In an embodiment, the winning hand of playing cards may be the highest ranking hand of five of a kind overall driving scores with a score range of 95-100. In another embodiment, the winning hand of playing cards may be any number of playing cards with the highest ranking card suits and card values in comparison to the playing cards of other players' hands. The player with the winning hand may subsequently be assigned a prize or a lottery ticket for an entry into at least one of a daily, weekly, monthly, annual, or periodic drawing for a prize.

The user interface 300 may also comprise one or more buttons 310, wherein a player may press a corresponding button 310 (e.g., by pressing a touch screen icon, moving a cursor, clicking a mouse, pressing a key on a keyboard) to fold, deal, place a bet, or call a hand of playing cards. The user interface 300 may also convey to a player an amount of tickets or value of gift cards that the player has bet or won during the poker game. For example, the user interface 300 shows that the player has won 5 lottery tickets and is currently betting a $15 gift card. The number of lottery tickets or gift cards bet and/or won by the player may be shown pictorially in the user interface 300 with an illustration or animation representing the betted and/or won amount (e.g., a picture of poker chips on the display representing the lottery tickets or gift cards). Moreover, indications (e.g., text, images, videos, animations, etc.) may be shown on the user interface 300 to inform the player of a winning hand of playing cards, receiving a lottery ticket or prize, or losing a game to another player. Alternatively, there might not need to be any betting, but only the chance to win tickets. In another embodiment, there may only be betting, with no additional possible winnings.

Figure 4:
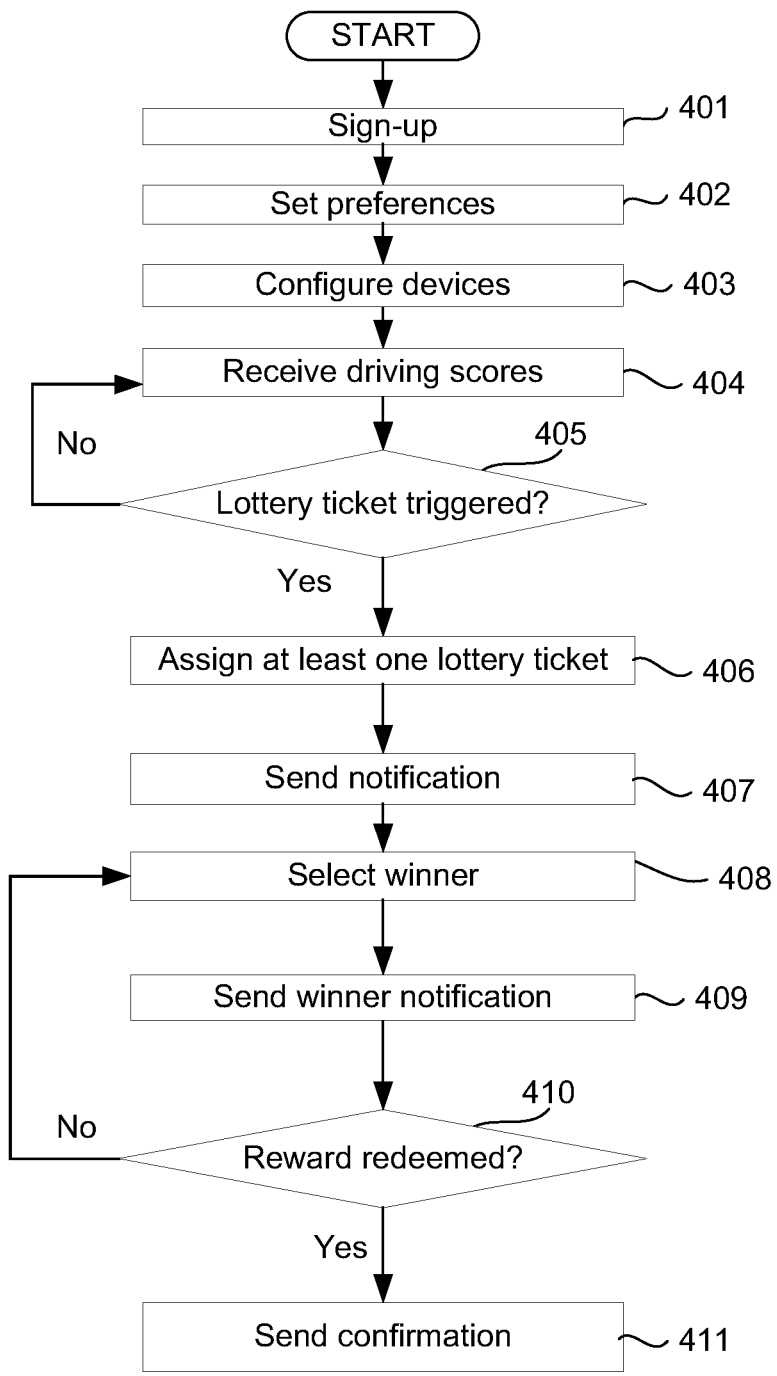
FIG. 4 illustrates a flow diagram of an example method in accordance with aspects of the present disclosure.

FIG. 4 illustrates a flow diagram of an example method in accordance with aspects of the present disclosure. In particular, FIG. 4 illustrates example method steps for assigning at least one lottery ticket based on driving score information. The steps of FIG. 4 may be performed by computing devices of the rewards subsystem 203. One or more of the steps of FIG. 4 may be performed by executing a lottery rewards program and/or operating a particularly configured computing device of the lottery rewards system. As a result of the method of FIG. 4, a driver at computing device 205, may be assigned at least one lottery ticket and notified of a winning lottery ticket.

The method of FIG. 4 may begin with a step 401 of signing-up for a lottery rewards service. A driver or customer (e.g., an insurance policy holder) may use a computing device 205, vehicle computing device 208, mobile device 210, or customer computing device 212 to sign-up for a service that allows that the driver or customer to receive rewards (e.g., lottery tickets). The sign-up process may be performed through a web portal provided by a server or system (e.g., rewards subsystem 203) within the interactive rewards system 202. For example, a driver may use a web browser to navigate to a particular website (e.g., insurance company website) and sign up for a lottery rewards service. In some embodiments, the driver may be signed-up to receive lottery rewards as part of creating a policy (e.g., an insurance policy) or as part of signing-up to receive non-reward goods or services. For example, the driver might sign up for a service that collects drive data and evaluates the driver's driving behavior, and in doing so, the driver may also be automatically enrolled in a lottery rewards service so that the interactive rewards system may allocate and maintain rewards for the driver.

Signing-up at step 401 may include providing a username, password, policy number, etc.

to the rewards subsystem 203 and/or indicating a driver's acceptance or agreement to terms and conditions. In some embodiments, signing-up may also include providing driver information (e.g., name, birthdate, address, gender, etc.), vehicle information (e.g., make, model, year, vehicle identification number (VIN), etc.), and/or mobile device 210 information (e.g., smartphone identifier, smartphone make and model, phone number, etc.). Further, in step 401, upon signing-up, the rewards subsystem 203 may create and/or assign an account to the driver. In an embodiment, the rewards subsystem 203 may store account information in the plurality of databases 220.

In step 402, a driver may set preferences. Preferences may be set in various manners. Initially, preferences may be set up through the web portal used to sign up for the rewards service. For example, preferences may be set on a website dedicated for a driver (e.g., a driver account page on the insurance company's website).

Preferences may be set using the computing device 205, vehicle computing device 208, mobile device 210, or customer computing device 212. These devices may receive user inputs and transmit the inputs to the servers within the rewards subsystem 203, which may record the preferences in association with the driver (e.g., in association with a policy associated with the driver). Some, or all, of the preferences may be stored locally on the driver's device (e.g., mobile device 210), remotely in one of the plurality of databases 220 or elsewhere in the rewards subsystem 203. In some embodiments, user preferences set in step 402 may be pulled from previously acquired information, such as from preferences set up when an insurance policy is opened.

One example of a preference set at step 402 may include whether the driver would like to participate in a driving behavior monitoring service using his/her phone or a device plugged into (or otherwise installed) in his/her vehicle 207. For example, the driver may choose between two options for collecting drive data—using a phone or device plugged into a vehicle 207. As another example of a preference, drivers may indicate that they wish to receive notifications of lottery tickets and/or rewards immediately upon earning the lottery tickets and/or rewards, daily, weekly, monthly, etc. and may indicate that they would like to receive notifications via email, text messages (e.g., SMS, MMS, etc.), push notifications, phone calls, etc. Another example of a preference may be designating the preferred type(s) of rewards that drivers would like the chance to earn.

In step 403, the interactive rewards system may be configured so that lottery rewards may be determined and allocated for particular drivers, and notifications may be sent to particular drivers regarding their rewards. Configuring at step 403 may include installing or plugging in a vehicle computing device 208 in the vehicle 207 so that drive data can be collected. Additionally, or alternatively, configuring may include downloading and installing a rewards manager 215 on a computing device 205 (e.g., smartphone) to be used to collect drive data. In another embodiment, configuring may include setting up a wireless connection (e.g., Bluetooth) or a wired connection (e.g., USB drive) between a machine in the rewards subsystem 203 and the computing device 210, vehicle computing device 207 or mobile device 210 to transfer driving score information to the rewards subsystem 203.

At step 404, the interactive rewards system (e.g., rewards subsystem 203) may receive driving score information. Driving score information may be collected from the computing device 210, vehicle computing device 207 or mobile device 210. The driving score information may comprise overall driving scores for a driver that are calculated from component scores for each of a plurality of driving factors associated with the driver. The plurality of driving factors may comprise speed, braking, steering, turn signals, miles driven, amount of time driven at night, amount of time driven during daytime, etc.

After receiving the driving score information, at step 405, the lottery system (e.g., rewards subsystem 203) may determine if the driving score information triggers assignment of at least one lottery ticket. In other words, step 405 may include determining whether or not a driver has earned at least one lottery ticket based on his or her driving scores. In some embodiments, some driving scores may trigger assignment of lottery tickets while others might not. Also, in some embodiments, a driving score above a predetermined score level may have to be received in order to trigger at least one lottery ticket to be given out. In other embodiments, a driving score within a predetermined score range may have to be received in order to trigger at least one lottery ticket to be given out. For example, if the maximum driving score value is 100, a driver may have to achieve a driving score value that is above or equal to 80 in order to receive at least one lottery ticket. Thus, if the driver receives a driving score of 79 or below, he or she may not receive a lottery ticket.

If the lottery system determines that the driving score information has not triggered lottery tickets to be assigned (No at step 405), the lottery system may return to step 404 to continue to receive driving score information. On the other hand, if the lottery system determines that at least one lottery ticket has been earned based on the driving score information (Yes at step 405), the lottery system may perform step 406. In step 406, the lottery system may assign at least one lottery ticket to the driver. In an embodiment, the assigned at least one lottery ticket may be stored in a lottery database 220 in the interactive rewards system 202.

The lottery system may identify component score values and overall driving score values for the driver based on the driving score information received at step 404. Based on the identified component score values and overall driving score values, the lottery system may determine a number of lottery tickets to assign to the driver at step 406. In an embodiment, the higher the driving score value, the greater number of lottery tickets a driver may receive. For example, 1 lottery ticket may be assigned for driving scores 80-84, 2 lottery tickets may be assigned for driving scores 85-89, and so forth (e.g., Table 1).

Upon assigning the at least one lottery ticket to the driver, at step 407, the lottery system may notify the driver of the assigned lottery ticket. For example, the rewards subsystem 203 may transmit a notification indicating that a driver has earned or received five lottery tickets. In some embodiments, the notification may also include a reason that the lottery tickets are being given. For example, the notification may indicate that a driver has won five lottery tickets for receiving a top daily driving score for five days in a row. In another embodiment, the notification may indicate potential prizes that the driver may be able to win, when the drawing for the lottery will be held, how many more chances the driver may have to win (e.g., 3 more days/drives left), what bonus tickets the driver may get by achieving one or more additional goals, etc.

The type of notification sent at step 407 may depend on user preferences, such as those preferences set in step 402. The lottery system may be configured to transmit the notifications as an email (e.g., to an email address designated by the driver), a text message (e.g. to a phone number designated by the driver), a push notification (e.g., to an application running on the driver's phone), or a voice message (e.g., an automatic phone call to a phone number designated by the user). In some embodiments, the notifications may be sent soon (e.g., approximately immediately) after determining that driving score information has triggered at least one lottery ticket to be assigned.

After lottery tickets have been assigned to a plurality of drivers, at step 408, the lottery system may select a winner in a lottery drawing for a reward. For example, programs or modules within the rewards subsystem 203 (e.g., a lottery tickets module) may be configured to randomly select a winning lottery in a drawing for a reward (e.g., wherein the winning lottery ticket is assigned using random probability). A lottery tickets module within the rewards subsystem 203 may apply various algorithms to randomly select the winner.

At step 409, the lottery system may send a winner notification to notify a driver that he or she has won the drawing for the reward. The winner notification may be a message indicating that the winning lottery ticket has been selected for the driver to win the prize in the lottery drawing. The winner notification may comprise details about the winning lottery ticket selected in the drawing, information about the prize won, as well as details on how the driver may redeem his or her prize.

In an embodiment, the driver may be notified of winning lottery tickets by receiving the winner notification at one or more of the following devices: computing device 205, mobile device 210, vehicle computing device 208, customer computing device 212, and television 214. For example, the driver may receive a winner notification through the rewards manager 216 on the computing device 216. The prize notification may be presented on the display 217 and may comprise a message or an indication (e.g., text, images, video, animation, etc.) informing the driver of his winning lottery ticket and the prize that the driver has won. In another embodiment, the driver may receive the winner notification through a web portal provided by a server or system within the rewards subsystem 203. For example, a driver may receive the winner notification by using a web browser to navigate to a particular website (e.g., insurance company website, social media website, etc.) on a customer computing device 212. In yet another embodiment, the driver may receive a winner notification by watching a program or commercial shown on a television 214. For example, when a driver is provided a lottery ticket, the driver may also be told of a time period, television channel, and/or television program that they should watch to see if they won the lottery. The winner of the lottery may be announced, for example, during a television program or immediately following a television program. For example, the winner could be announced during half-time of a Super Bowl or other sporting event. In other embodiments, the driver may be notified of a winning lottery ticket by email, text messages (e.g., SMS, MMS, etc.), push notifications, and phone calls on his or her mobile device (e.g., mobile device 210). Alternatively, the lottery system (e.g., rewards manager) may also "search" among a driver's lottery tickets to determine if the winning lottery number (e.g., corresponding to a winning lottery ticket) is found, wherein the search may be performed by comparing text, images, videos, animations, etc. If a winning lottery ticket is found, the driver may be notified.

After sending a winning lottery ticket notification, the lottery system may determine if a reward has been redeemed at step 410. In some embodiments, the reward for the winning lottery ticket may be redeemed automatically, wherein the driver might not be obliged to proactively claim the prize. Otherwise, step 410 may include determining whether or not a driver has redeemed his or her winning lottery ticket to redeem his or her prize within a predetermined period of time. In some embodiments, a driver may redeem a reward by accessing the rewards subsystem 203 through a web portal on the computing device 205, mobile device 210, vehicle computing device 208 or customer computing device 212 within the predetermined period of time. For example, the driver may log online to confirm that he or she has the winning lottery ticket and to claim the prize within the predetermined period of time (e.g., a day, a week, a month, etc.). After the driver claims the prize, the rewards subsystem 203 may subsequently receive a message indicating that the driver has redeemed the lottery ticket to claim the prize.

If the lottery system determines that the reward has not been redeemed by the driver with the winning lottery ticket (No at step 410), the lottery system may return to step 408 to select a new winner. In an embodiment, the lottery system may randomly select a new lottery ticket in the drawing if the reward is not redeemed by the original winner. The driver associated with the new lottery ticket may claim the prize by confirming his or her winning lottery ticket. In an embodiment, the value of the prize may increase or be added to the next drawing's prize value if not redeemed by the winning driver within the predetermined period of time. For example, the value of the unclaimed prize, such as a $100 discount on insurance premiums, may be added to the next drawing's prize of a $100 discount on insurance premiums, resulting in a new prize of $200 discount on insurance premiums.

If the lottery system determines that the reward has been redeemed by the driver (Yes at step 410), the lottery system may perform step 411. In step 411, the lottery system may send a confirmation to the driver. The confirmation may be a message that informs the driver that the prize has been redeemed and may include further details about the prize. That is, if the prize is an insurance discount, the confirmation may be sent to the driver along with a coupon or a check for the insurance discount which can be used in the future. If the prize is travel tickets, a voucher for free air travel or a number to call to book a predetermined flight may be sent to the driver, along with the confirmation.

Figure 5:
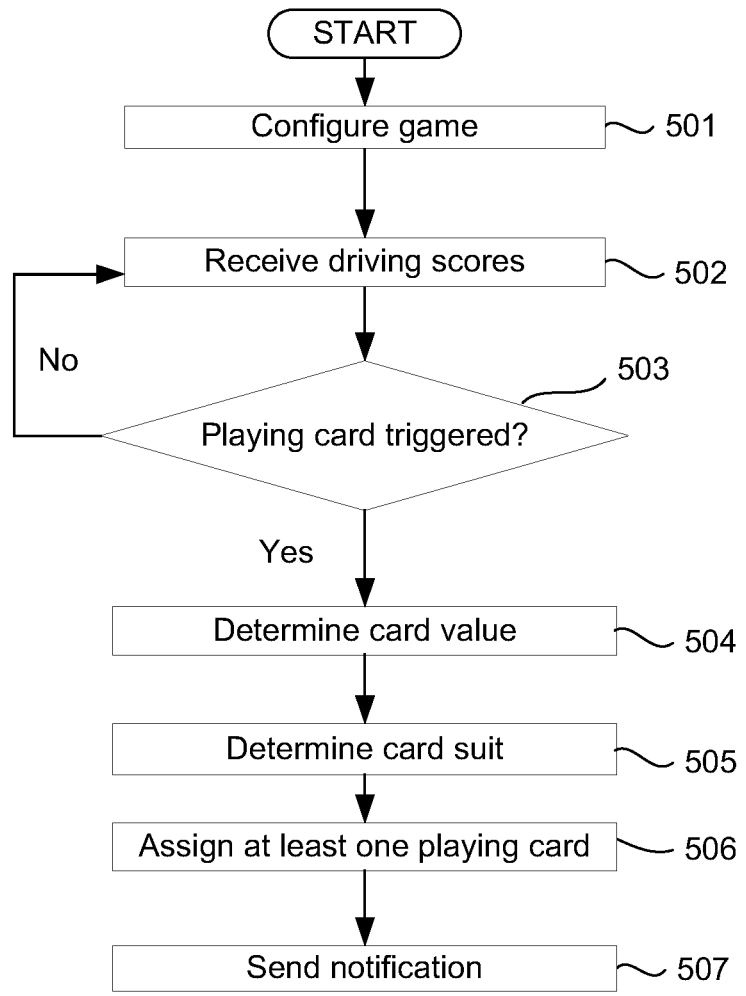
FIG. 5 illustrates a flow diagram of another example method in accordance with aspects of the present disclosure.

FIG. 5 illustrates another flow diagram of an example method in accordance with additional aspects of the present disclosure. More specifically, FIG. 5 illustrates example method steps for assigning at least one playing card in a poker game based on driving score information. The steps of FIG. 5 may be performed by computing devices of the rewards subsystem 203. One or more of the steps of FIG. 5 may be performed by executing a rewards program and/or operating a particularly configured computing device of a gaming system within the interactive rewards system 202. As a result of the method of FIG. 5, a driver at computing device 205 may be assigned at least one playing card and subsequently notified.

The method of FIG. 5 may begin with step 501 of configuring a card game, such as a poker game. Configuration may include signing-up for the rewards service and initializing games. A driver or customer (e.g., an insurance policy holder) may use a computing device 205, vehicle computing device 208, mobile device 210, or customer computing device 212 to sign-up to participate in games offered by the gaming system, in which drivers may receive lottery tickets and/or rewards by winning games.

Signing-up at step 501 may include providing a username, password, policy number, etc. to the rewards subsystem 203 and/or indicating a driver's acceptance or agreement to terms and conditions. In some embodiments, signing-up may also include providing driver information (e.g., name, birthdate, address, gender, etc.) and/or mobile device 210 information (e.g., smartphone identifier, smartphone make and model, phone number, etc.). Further, in step 501, upon signing-up, the rewards subsystem 203 may create and/or assign an account to the driver. In an embodiment, the rewards subsystem 203 may store account information in the plurality of databases 220. In another embodiment, the driver may have already signed-up for the rewards service and/or games by using a web browser to navigate to a particular website (e.g., insurance company website) to sign-up. After signing-up, the driver may sign-on a website or application on his or her phone and initialize a card game, such as a poker game. For example, the rewards subsystem 203 may provide a user interface presented on a display (e.g., display 217 of the computing device 205) by an application (e.g., rewards manager 216). The provided user interface (e.g., user interface 300) may allow a driver to play a card game and/or other video games with peer drivers or friends. Additionally, the rewards subsystem 203 may access a playing cards database and a games database in a plurality of databases 220 in order to retrieve information for configuring and setting up the game in step 501.

At step 502, the gaming system within the interactive rewards system 202 may receive driving score information. Driving score information may be collected from the computing device 210, vehicle computing device 207 or mobile device 210. The driving score information may comprise overall driving scores for a driver that are calculated from component scores for each of a plurality of driving factors associated with the driver. The plurality of driving factors may comprise speed, braking, steering, turn signals, miles driven, amount of time driven at night, amount of time driven during daytime, etc. In an embodiment, the driving score information may be stored in a database 220 within the rewards subsystem 203.

After receiving the driving score information, at step 503, the gaming system may determine if the driving score information triggers assignment of a playing card. In other words, step 503 may include determining whether or not a driver has earned at least one playing card based on his or her driving scores. In some embodiments, some driving scores may trigger assignment of playing cards while others might note. Also, in some embodiments, a driving score above a predetermined score level may have to be received in order to trigger at least one playing card to be given out. In other embodiments, a driving score within a predetermined score range may have to be received in order to trigger at least one playing card to be given out. For example, if the maximum driving score value is 100, a driver may have to achieve a driving score value that is above or equal to 80 in order to receive at least one playing card. Thus, if the driver receives a driving score of 79 or below, he or she might not receive a playing card.

If the gaming system determines that the driving score information has not triggered at least one playing card to be assigned (No at step 503), the gaming system may return to step 502 to continue to receive driving score information. On the other hand, if the gaming system determines that at least one playing card has been earned based on the driving score information (Yes at step 503), the gaming system may perform step 504. In step 504, the gaming system may determine a card value for the at least one playing card.

Card values may be determined based on identified component score values and overall driving score values. In some embodiments, driving score values and component score values may be grouped into four predetermined score ranges to correspond to four different card values. For example, 100 may be the maximum driving score value, and the four predetermined score ranges, in order of weakest to strongest card values, may be 80-84, 85-89, 90-94, and 95-100. Thus, a card value may be determined based on the predetermined score ranges.

In some embodiments, step 504 may include randomly selecting a card value from among a set of possible card values. In an embodiment where a traditional poker game is being played, a card value may be randomly selected. For example, step 504 may include randomly selecting a card value from among the set of values including Ace, King, Queen, Jack, ten, nine, eight, seven, six, five, four, three, two, and/or Joker. Depending on the type of card game being played the card values may be different. For example, if the card game "UNO" is being played, the card value may be a number from zero to nine, "skip," "draw two," "wild," etc.

At step 505, the gaming system may determine a card suit for the at least one playing card. Card suits may be determined based on specific driving factors. For example, card suits may include the following, in order of strongest to weakest card suits: overall driving score, braking score, turn signals score, night-time driving score, daytime driving score, and other component scores. The overall driving score may be a weighted average of each of the component scores and may be the strongest card suit.

In some embodiments, step 505 may include randomly selecting a card suit from among a set of possible card suits, or determining a card suit from their driving scores. In an embodiment where a traditional poker game is being played, a card suit may be randomly selected. For example, step 505 may include randomly selecting a card suit from among the set of suits including hearts, diamonds, clubs, and spades. Depending on the type of card game being played the card suits may also be different. For example, if the card game "UNO" is being played, the card suit may be a color from the set of colors including red, green, blue, and yellow.

At step 506, the gaming system may assign the at least one playing card with the determined card value and card suit to the driver. In an embodiment, the rewards subsystem 203 may store the assigned at least one playing card in a playing cards database 220 in the interactive rewards system 202. At step 507, the gaming system may send a notification of the assigned at least one playing card to the driver. For example, the rewards subsystem 203 may transmit a notification indicating that a driver has earned or received five playing cards. In an embodiment, the notification may comprise the card suits and card values of each of the playing cards assigned to the driver. In another embodiment, the notification may result in the assigned at least one playing cards being added to a driver's hand of playing cards in the poker game. The notification may also show what other cards the driver currently has, what hands the driver may make with the current cards, and what other cards the driver may need to make an even better hand (e.g., while motivating the driver to reach a certain driving goal). The driver may receive the notification in the user interface (e.g., user interface 300) of the poker game, wherein the playing cards received by the driver may be shown pictorially in the user interface 300 with an illustration or animation representing the assigned playing cards. Moreover, indications (e.g., text, images, videos, animations, etc.) may be shown on the user interface 300 to inform the driver of acquired playing cards.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
  receiving, by a server and from a mobile computing device, driving data associated with a driver of a vehicle and collected from one or more motion sensors of the mobile computing device, wherein the driving data comprises a plurality of driving factors associated with the driver's operation of the vehicle;
  receiving, from one or more environmental sensors of the vehicle, an environmental condition outside of the vehicle;
  determining, based on the driving data associated with the driver and the environmental condition outside of the vehicle, a driving score of the driver;
  associating, based on the driving score, at least one group reward to a first group of drivers comprising at least the driver and one other driver;
  associating, based on a comparison of the driving score to a plurality of driver scores of the first group of drivers, an individual reward with the driver of the vehicle;
  updating, based on the at least one group reward and the individual reward, a database of gaming pieces of an electronic online game, wherein updating the database of gaming pieces includes updating one or more gaming pieces corresponding to the driver and the one other driver registered with the electronic online game;

sending, to each of the first group of drivers, a notification indicating that the at least one group reward has been assigned to the first group of drivers; and executing at least a portion of the electronic online game on a computing device, wherein the update to the gaming piece is based on the at least one group reward and the individual reward and is redeemable by the driver for interacting with the electronic online game to alter the execution of the electronic online game through the computing device, the electronic online game playable by the driver and the one other driver registered with the electronic online game.

2. The method of claim 1 wherein updating the database of gaming pieces comprises improving a skill level of the driver within the electronic online game.

3. The method of claim 1, further comprising:
evaluating an effect of change in driving data on the gaming piece assigned to the driver;
generating, based on the evaluation, one or more suggestions for the driver; and
outputting, to a user interface of the mobile computing device, the one or more suggestions for the driver.

4. The method of claim 1, further comprising:
determining an increase in the driving score of the driver; and
notifying the driver of the increase.

5. The method of claim 4, further comprising:
associating a second gaming piece to the driver based on the increase in the driving score, the second gaming piece corresponding to the electronic online game accessible through the computing device, the gaming piece redeemable by the driver for further interaction with the electronic online game through the computing device.

6. The method of claim 1 wherein the electronic online game comprises one of a virtual chess game, a virtual football game, a virtual first-person shooter game, or a virtual role-playing game.

7. The method of claim 1 wherein updating the database of gaming pieces of the electronic online game comprises unlocking a previously unavailable character of the electronic online game.

8. The method of claim 1 wherein updating the gaming pieces of the electronic online game comprises unlocking a previously unavailable weapon of the electronic online game.

9. The method of claim 1 wherein the mobile computing device comprises an on-board diagnostic device connected to a telemetry system of the vehicle.

10. A system for online gaming comprising:
at least one processor;
a communication interface communicatively coupled to the at least one processor and receiving a mobile computing device associated with a vehicle, driving data associated with a driver of the vehicle and collected from one or more motion sensors of the mobile computing device, and an environmental condition outside of the vehicle from one or more environmental sensors of the vehicle, wherein the driving data comprises a plurality of driving factors associated with the driver's operation of the vehicle; and memory storing computer-readable instructions that, when executed by the at least one processor, cause the at least one processor to:
determine, based on the driving data associated with the driver and the environmental condition outside of the vehicle, a driving score of the driver;
associate, based on the driving score, at least one group reward to a first group of drivers comprising at least the driver and one other driver;
associate, based on a comparison of the driving score to a plurality of driver scores of the first group of drivers, an individual reward with the driver of the vehicle;
update, based on the at least one group reward and the individual reward, a database of gaming pieces of an electronic online game, wherein updating the database of gaming pieces includes updating one or more gaming pieces corresponding to the driver and the one other driver registered with the electronic online game;
send, to each of the first group of drivers, a notification indicating that the at least one group reward has been assigned to the first group of drivers; and
execute at least a portion of the electronic online game on a computing device,
wherein the update to the gaming piece is based on the at least one group reward and the individual reward and is redeemable by the driver for interacting with the electronic online game to alter the execution of the electronic online game through the computing device, the electronic online game playable by the driver and the one other driver registered with the electronic online game.

11. The system of claim 10 wherein updating the database of the electronic online game comprises improving a skill level of the driver within the electronic online game.

12. The system of claim 10, wherein the computer-readable instructions further cause the at least one processor to:
evaluate an effect of change in driving data on the gaming piece assigned to the driver;
generate, based on the evaluation, one or more suggestions for the driver; and
output, to a user interface of the mobile computing device, the one or more suggestions for the driver.

13. The system of claim 10, wherein the computer-readable instructions further cause the at least one processor to:
determine an increase in the driving score of the driver; and
notify the driver of the increase.

14. The system of claim 13, wherein the computer-readable instructions further cause the at least one processor to:
associate a second gaming piece to the driver based on the increase in the driving score, the second gaming piece corresponding to the electronic online game accessible through the computing device, the gaming piece redeemable by the driver for further interaction with the electronic online game through the computing device.

15. The system of claim 10 wherein the electronic online game comprises one of a virtual chess game, a virtual football game, a virtual first-person shooter game, or a virtual role-playing game.

16. A non-transitory computer-readable storage medium having computer-executable program instructions stored thereon that when executed by a processor, cause a computing device to perform:

receiving, by a server and from a mobile computing device, driving data associated with a driver of a vehicle and collected from one or more motion sensors of the mobile computing device, wherein the driving data comprises a plurality of driving factors associated with the driver's operation of the vehicle;

receiving, from one or more environmental sensors of the vehicle, an environmental condition outside of the vehicle;

determining, based on the driving data associated with the driver and the environmental condition outside of the vehicle, a driving score of the driver;

associating, based on the driving score, at least one group reward to a first group of drivers comprising at least the driver and one other driver;

associating, based on a comparison of the driving score to a plurality of driver scores of the first group of drivers, an individual reward with the driver of the vehicle;

updating, based on the at least one group reward and the individual reward, a database of gaming pieces of an electronic online game, wherein updating the database of gaming pieces includes updating one or more gaming pieces corresponding to the driver and the one other driver registered with the electronic online game;

sending, to each of the first group of drivers, a notification indicating that the at least one group reward has been assigned to the first group of drivers; and executing at least a portion of the electronic online game on a computing device, wherein the update to the gaming piece is based on the at least one group reward and the individual reward and is redeemable by the driver for interacting with the electronic online game to alter the execution of the electronic online game through the computing device, the electronic online game playable by the driver and the one other driver registered with the electronic online game.

17. The non-transitory computer-readable storage medium of claim 16, further comprising computer-executable instructions that, when executed by the processor, cause the computing device to perform:

evaluating an effect of change in driving data on the gaming piece assigned to the driver;

generating, based on the evaluation, one or more suggestions for the driver; and outputting, to the mobile computing device, the one or more suggestions for the driver.

18. The non-transitory computer-readable storage medium of claim 16, further comprising computer-executable instructions that, when executed by the processor, cause the computing device to perform:

determining an increase in the driving score of the driver; and notifying the driver of the increase.

19. The non-transitory computer-readable storage medium of claim 18, further comprising computer-executable instructions that, when executed by the processor, cause the computing device to perform:

associating a second gaming piece to the driver based on the increase in the driving score, the second gaming piece corresponding to the electronic online game, the gaming piece redeemable by the driver for further interaction with the electronic online game through the computing device.

20. The non-transitory computer-readable storage medium of claim 16 wherein the electronic online game comprises one of a virtual chess game, a virtual football game, a virtual first-person shooter game, or a virtual role-playing game.

\* \* \* \* \*